Figure 1:
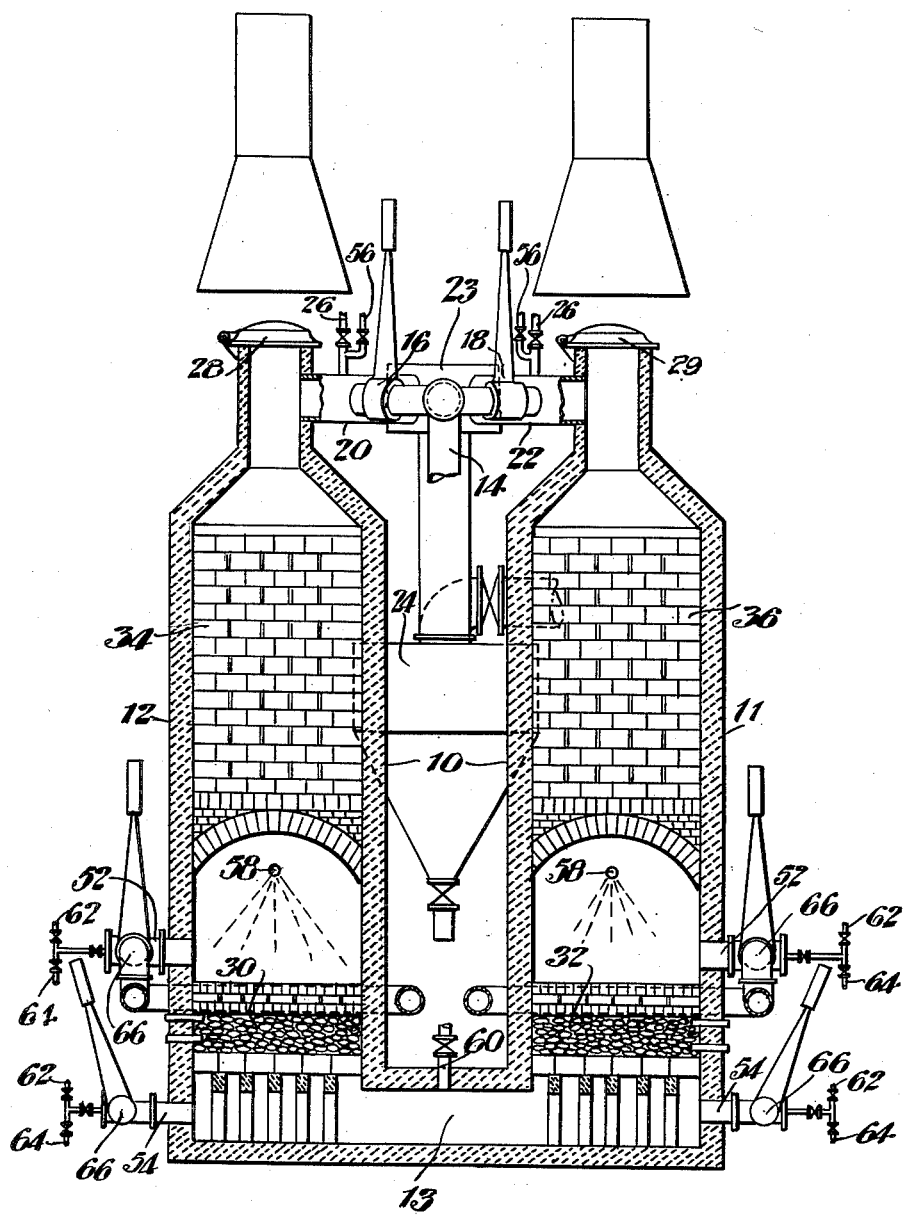

March 5, 1940.　　A. JOHNSON ET AL　　2,192,815
MANUFACTURE OF COMBUSTIBLE GAS
Filed Dec. 10, 1937　　2 Sheets-Sheet 2

INVENTORS
ALFRED JOHNSON
MORRIS M. BRANDEGEE
BY
ATTORNEY

Patented Mar. 5, 1940

2,192,815

UNITED STATES PATENT OFFICE 2,192,815

MANUFACTURE OF COMBUSTIBLE GAS

Alfred Johnson, Summit, and Morris M. Brandegee, Plainfield, N. J., assignors to Combustion Utilities Corporation, New York, N. Y., a corporation of Maine Application December 10, 1937, Serial No. 179,076

6 Claims. (Cl. 48—75)

This invention relates to the manufacture of combustible gas, and is more particularly concerned with improved methods of and apparatus for generating from hydrocarbon mixtures gas having a wide range of heating value and specific gravity for use in industrial and domestic heating.

Methods and apparatus have been heretofore developed by us both individually and jointly by which mixtures of oil gas or reformed natural gas and water gas can be produced by cyclic operations including the steps of contacting oil or natural gas and steam with a highly heated bed or screen of small uniformly sized ceramic brick in a generator, followed by air blasting of the ceramic bed or screen between gas make periods under conditions designed to burn off carbon deposited on the ceramic material during a previous gas making run and to regenerate from the resulting blow gases at least part of the heat for carrying on a subsequent gas making operation.

A particular object of the present invention is to meet the demand for gas generating apparatus adapted for thermally efficient operation in accordance with operating cycles which may be intermittent or continuous. Another object of the invention is to provide apparatus, and operating cycles adapted for practice in the apparatus, having sufficient flexibility and adjustibility to permit of the manufacture of gas having a wide range of calorific value (for example between 100 and 1600 B. t. u. per cubic foot).

Another principal object of the invention is to provide improved methods and apparatus for generating combustible gas with a high degree of heat utilization efficiency.

Another object of the invention is to provide improved designs of single and double shell gas generators, and improved intermittent operating cycles for practice therein, whereby the generators may be operated efficiently employing a relatively short heating period in relation to the gas make period.

A feature of the invention resides in the use as a gas generator of a refractory lined conduit having gas off-takes and air and steam inlets opening into each end thereof, and also having two (2) carbon filtering screens of small uniformly sized ceramic brick mounted in longitudinally spaced relation transversely within the conduit about midway between its ends, together with checkerbrick regenerators between each screen and the adjacent end of the conduit, and means for introducing a hydrocarbon fluid to be cracked into the conduit at a point adjacent the screen; the relative arrangement of the refractory screens and the checkerbrick regenerators within the conduit permitting operation of the conduit with gas flow in either direction therethrough and with regeneration of heat from the make and blow gases and return of such heat to the mid-zone of the conduit where high temperature oil cracking and generation of gas takes place.

With the above and other objects and features in view the invention consists in the improved method of and apparatus for generating gas as hereinafter described and more particularly defined by the accompanying claims.

In the drawings forming a part hereof, a preferred apparatus design is illustrated.

In Fig. 1 of the drawings there is shown a front vertical section of a two (2) shell gas generating set which has been modified to include a ceramic carbon filtering screen at the base of each shell, hydrocarbon burner units in close heating relationship with the screens, and checkerbrick regenerators and connections whereby the set may be operated in accordance with several different operating cycles.

Figure 2:
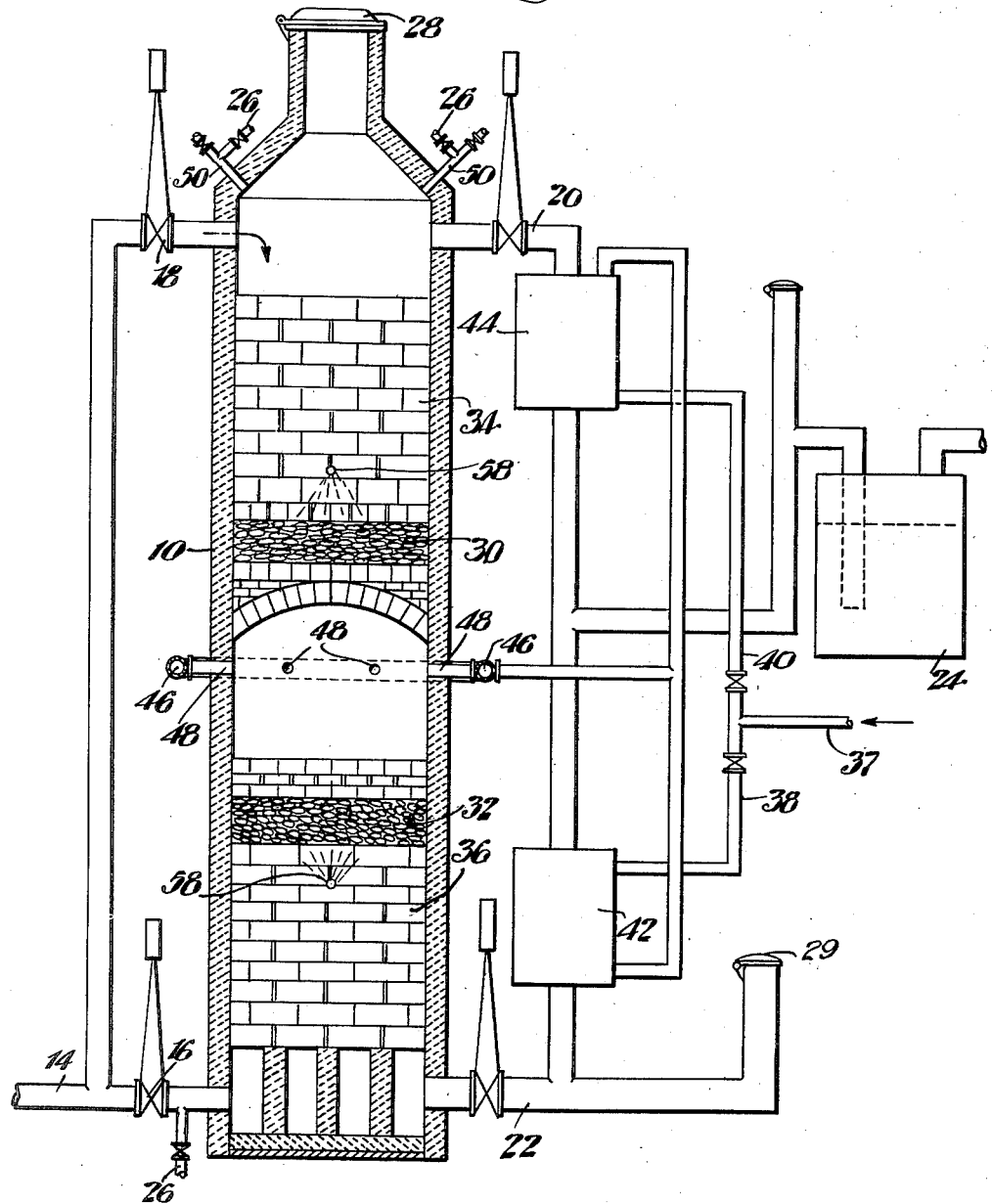

Fig. 2 is another front view in vertical section of a single shell gas generator designed to include a pair of spaced refractory screens and accompanying checkerbrick regenerators and connections disposed in substantially the same operating relation to each other as the corresponding elements which make up the gas generating unit illustrated in Fig. 1.

Referring to both figures of the drawings, numeral 10 designates a gas generator in the form of a refractory lined conduit having a length several times its maximum cross-sectional dimension, said conduit in Fig. 2 taking the form of a single upright shell, while in Fig. 1 the conduit consists of two (2) vertical shells 11 and 12 each connected to the other at its base by a communicating passageway 13. Air may be supplied to each end of the conduit 10 from a main air supply pipe 14 through connecting passageways controlled respectively by valves 16 and 18. Likewise make gas may be removed from each end of the conduit 10 through gas offtake pipes 20 and 22, both of which normally lead through a two-way valve 23 to a common washbox 24. Steam supply pipes 26 are provided whereby steam may be introduced to each end of the conduit 10. Each end of the conduit 10 is also provided with lean gas offtakes controlled by stack valves 28 and 29 communicably connecting the interior of the conduit with atmosphere. Within the conduit about mid-way between its ends there is mounted a pair of longitudinally spaced refractory screens 30 and 32, each screen extending transversely of the conduit and serving as a carbon filtering screen for gases passing longitudinally through the conduit. Screens 30 and 32 are mounted within the conduit on checkerbrick supports, and each screen is composed of a bed of small uniformly sized bricks or balls at least one foot in depth. The depth of the screen may be varied somewhat depending upon the character of the gas which is to be produced by the plan of operation. Since temperatures as high as 2500°–2700° F. may be developed on the surface of the refractory in the generator screens 30 and 32, these screens are preferably composed of high alumina ceramic material adapted to withstand spalling due to the rapid temperature changes to which they are subjected. The individual ceramic bricks or balls which make up the screens 30 and 32 are preferably sized so that their maximum linear dimension or diameter does not exceed two to three inches.

Checkerbrick regenerators 34 and 36 are mounted within the conduit 10 so as to occupy most of the space between the corresponding refractory screens 30 and 32 and the adjacent ends of the generator. In the apparatus illustrated in Fig. 2 means are provided including a supply pipe 37, valved connecting pipes 38 and 40, recuperators 42 and 44, a manifold 46, and radially disposed inlet ports 48, whereby to introduce a fluid hydrocarbon such as natural gas into the space in the mid-zone of the generator 10 between the two refractory screens 30 and 32. The recuperators 42 and 44 are mounted in operative relation to the respective ich gas offtakes 20 and 22 whereby to effect heat exchange between make gas leaving the generator and fluid hydrocarbon entering the generator through the ports 48. One or more fluid hydrocarbon burners 50 are shown as mounted on the top of the generator of Fig. 2 for use in supplementing the heat supply to the generator during periods between gas generating cycles.

In the apparatus of Fig. 1 any heat developed by burning off carbon deposits which are formed in the screens 30 and 32 and in the checkerbrick regenerators 34 and 36 during the gas make periods is supplemented during the heating up periods by operation of one or more forced draft oil burner units 52 and 54 which are located both above and below the refractory screens 30 and 32. Likewise supply pipes 56 for fluid hydrocarbon are ported out at the top of each of the two vertical shells making up the generator unit, and oil supply pipes 58 are ported out axially into the lower portion of each shell at points above the respective screens 30 and 32 and below the respective checkerbrick regenerators 34 and 36. A valved hydrocarbon supply pipe 60 is ported out in the passageway 12 between the two screens 30 and 32 in approximately the same relative position as the corresponding fluid hydrocarbon supply pipes and ports 48 by which hydrocarbon is introduced between the screens in the apparatus of Fig. 2.

The forced draft oil burner units 52 and 54 with which the apparatus of Fig. 1 is equipped are so designed that they may function as steam injection ports, as oil sprays, and as forced draft oil burners. For this purpose each burner is equipped with separate valved oil and steam supply connections 62 and 64. Likewise, each burner is equipped with a valved primary air connection 66 whereby air for operating the burner may enter the unit tangentially from an air supply duct.

The first operating cycle which will be described can best be practiced in apparatus of the type illustrated in Fig. 1. This cycle is designed to convert a heavy fuel oil of the type of Bunker "C" fuel oil into a mixed oil gas-water gas product having a calorific value in the range of 500 to 1200 B. t. u. per cubic foot. The first step in the cycle is a heating operation in which primary air is admitted through the pipe 22 to the top of the right hand generator shell 11. This blast of primary air in passing through the checkerbrick 36 and through the screen 32 is given a high degree of preheat by absorption of heat stored in the regenerator and checkerbrick during a preceding gas make cycle. In passing through the screen 32 the preheated air burns off any carbon previously deposited on the refractory bricks composing the screen during a preceding gas making cycle, thereby generating producer gas. The mixture of producer gas and any unreacted air passes from the base of the shell 11 through the passage 13 into the base of the shell 12 and upwardly through the screen 30. Above the screen 30 secondary air is admitted during this portion of the blast cycle to burn the producer gas to furnish heat for heating up the screen 30 and regenerator 34. The burned blast gas is exhausted to atmosphere by opening the stack valve 28 at the top of the left hand shell. The heat produced during this blasting operation may be supplemented by operation of the oil burners 54 and 52 located respectively at the base of the shell 11 and above the screen 30 in shell 12. This forward blast through the apparatus from right to left is followed by a reverse blast from left to right, with the stack valve 28 closed, stack valve 29 open, primary air admitted to the top of shell 12 through pipe 20, and secondary air admitted above the screen 32 in shell 11. The waste reverse blast gases are exhausted to atmosphere past the open stack valve 29. To supplement the heat developed during this reverse blast the oil burner above the screen 32 may be operated, and if necessary also the oil burner below the screen 30 in shell 34.

At the completion of the air blast heating period both stack valves 28 and 29 are closed, and steam is admitted to the top of regenerator 34 through the steam connection 26. In passing downwardly through the regenerator 34 the steam takes on a high degree of superheat and this superheated steam picks up and vaporizes the oil introduced through the spray 58 above the screen 30. In passing through the screen 30 the oil and steam react to produce a mixture of oil gas and water gas, and this mixture, including any unreacted steam and oil vapors, passes upwardly through the screen 32 where additional conversion takes place. Enriching oil is introduced into the make gas through the spray 58 above the screen 32 in the right hand shell, and the make gas produced after passing through regenerator 36 exits from the apparatus at the top of the shell and flows through the washbox 24 and the rich gas main leading therefrom to the make gas holder (not shown).

The make run from left to right in the apparatus is followed by a reverse run in which steam enters the top of the right hand shell 11 and passes downwardly through the regenerator 36, after which the superheated steam picks up oil vapors and carries such vapors along through the screens 32 and 30 in series. The resulting mixture of oil gas and water gas is enriched by oil introduced from the spray 58 in the left hand shell, and part of the sensible heat of the enriched make gas is regenerated in regenerator 34 before the gas leaves the top of the left hand shell for removal through the washbox 24 to storage. The make run from right to left is followed by a short steam purge during which the oil sprays 58 in both shells are cut off and steam passes in series downwardly through the right hand shell and upwardly through the left hand shell, the steam reacting with deposited carbon resulting from the cracking of the oil during the make run to produce water gas. The gas produced during the purge, and also a portion of the blow gas produced during the first part or the last part of the air blast cycle, may be conducted to the make gas holder. Any blow gas which is conducted to the holder is of course not burned to heat the regenerators—in other words, in producing this blow gas the secondary air opening is delayed to effect a blast purge to the holder.

Adjustment of the calorific value of the make gas is largely effected by varying the quantity of oil which is introduced as enriching oil, although considerable variation may also be effected by adjusting the quantity of primary make gas oil which is cracked in passing through the screens 30 and 32. The oil gas which is produced by cracking the oil vapors in an atmosphere of steam in passing through the refractory screens is a low gravity low B. t. u. gas (i. e. .28 to .40 specific gravity and 350 to 550 B. t. u. per cubic foot). The enriching oil which is introduced above the second screen in the path of flow of the cracked oil gas-water gas mixture is vaporized above the screen and cracked in an atmosphere of the make gas (that is, an atmosphere of hydrogen, cracked hydrocarbon gas, and blue gas). This enricher gas never passes through the refractory screens 32 or 30 but is fixed during its passage through one of the regenerators. Any carbon produced on cracking the enricher oil is deposited chiefly on top of the screen immediately below the point where the oil is introduced.

Control of the temperatures obtaining in the cracking zone is largely effected by adjustment of the oil burners which operate between the screens and above the screens during the air blast heating cycles. The temperature of the checkerbrick is preferably maintained within the range of 1350° F. to 1750° F. to insure the production of an enricher gas having a calorific value range of 800 to 1600 B. t. u. per cubic foot. and a final make gas in the range of 500 to 1200 B. t. u. per cubic foot.

In the operating cycle just described any free carbon produced during the cracking of the original charge oil is largely deposited on the surfaces of the brick within the screens 30 and 32. A substantial portion of the sensible heat of the blow gas, as well as of the make gas, is regenerated, and returned to the screens in the form of preheated air and superheated make steam. Thus a major portion of the heat developed in the operation of the process is always concentrated in the zone of the screens 30 and 32 at the base of each vertical shell of the generator. Burners 52 and 54 are provided above and below each screen for use during the heating period to insure development of suitable oil cracking temperatures in the screen and maintenance of any desired temperature equilibrium between the screens. The operating cycle insures a return of heat to the zone of the screens both during the blast and during the make cycle, and includes a reverse blast as well as a reverse run.

The apparatus of Fig. 1 may be operated according to a second cyclic method, according to which make steam is admitted to the base of both shells of the set during the run and passed upwardly through the screens to absorb superheat, oil being simultaneously sprayed on the screens of both shells and the oil vapors picked up and carried through the respective regenerators 34 and 36. The make gas thus produced is removed to storage from the washbox 24. In this cycle any carbon produced by oil cracking is deposited on the screens, without admitting oil for cracking through the screens. The heating portion of the cycle may be conducted by alternate reverse blows in both directions through the entire set, in the manner previously described.

Another operating cycle for which the apparatus of Fig. 1 is adapted involves the reforming of a hydrocarbon gas such as natural gas in the upper portion of one shell of the set, followed by the introduction of enriching oil above the screen in the other shell of the set. In this cycle a mixture of steam and hydrocarbon gas may be introduced to the top of the left hand shell from the respective supply pipes 26 and 56, and in passing downwardly through the left hand regenerator 34 and through the screen 30 the hydrocarbon gas is cracked. The cracked gas products react with the steam to produce an increased volume of low B. t. u. reformed gas. The calorific value and gravity of this gas may be adjusted by controlled admission of enricher oil into the reformed gas stream after it has passed upwardly through the screen 32 in the right hand shell. A mixture of enricher oil gas and reformed gas then passes through the right hand regenerator 36 and from thence to storage through the washbox 24. The gas reform operation would normally be conducted with apparatus such as illustrated in Fig. 1 on an intermittent cycle, in which between each make period the apparatus is reheated by alternate reverse air blast cycles such as have been previously described. Likewise, it will be understood that this gas reform operation may be conducted with periodic reversal of the direction of the flow of the gas make cycle. The resulting reform gas may be adjusted as to calorific value within the range of 150 to 800 B. t. u. per cubic foot.

The apparatus of Fig. 1, like the apparatus of Fig. 2, is so designed that it can be operated on a continuous gas reforming cycle in which a mixture of air, steam, and rich hydrocarbon gas such as natural gas enters one end of the apparatus and the reforming operation takes place during the flow of the reaction mixture from one end of the apparatus to the other. Regeneration and return of the heat developed to the cracking zone in the midportion of the apparatus is effected by periodically reversing the direction of flow of the reaction mixture and make gases throughout the length of the generator unit. The amount of air required to maintain equilibrium conditions suitable for a continuous, as distinguished from an intermittent, cycle, lies within the proportions of three to six volumes of air to each volume of gas supplied for reform. The proportions of air within these limits depends on the desired calorific value and specific gravity of the final reformed gas, and also on the reaction temperature and the degree of preheat which is imparted to the reacting gases. During a continuous reform cycle the stack valves 28 and 29 should never be opened. By imparting regenerated preheat to the reacting air, steam and gas, it is possible to produce a reform gas of higher calorific value than has been heretofore obtainable on a continuous cycle, while operating with an air-gas ratio as low as 3 to 1.

The apparatus of both figures is also adapted for practicing a cycle in which oil gas is generated, or rich hydrocarbon gas of the type of natural gas is reformed by reaction with between one and three parts of air for each part of oil or raw gas during the gas make portion of the cycle. Manufacture of gas according to this cycle can be conducted with relatively short air blow heating periods, followed by relatively long gas make periods, because the air employed during the gas make portion of the cycle will develop a substantial portion of the exothermic energy required for keeping up gas making temperatures within the apparatus.

Whenever the apparatus is employed for reforming hydrocarbon gas to a gas of lower calorific value, the operating temperatures maintained in the screens 30 and 32 are preferably kept within the range of 1900°–2100° F., rather than in the higher screen temperature range which is preferred in generating the low gravity low B. t. u. oil gas. The oil gas process preferably operates on a four to six minute cycle, but the continuous gas reform operation may be carried out on a cycle involving a four to eight minute reversal period.

In addition to the more nearly balanced thermal operation which is obtained by the use of the apparatus of Figs. 1 and 2 in the various operating cycles which have just been described, another advantage lies in the fact that by reason of the increased efficiency of oil to gas conversion and the more nearly balanced thermal cycle, the make gas produced finally leaves the generator at a lower temperature with resultant reduction in required gas cooling and condensing capacity in a given sized plant. Greater conversion efficiency is a direct result of the use of preheated air and preheated steam, with consequent higher and more uniform temperatures in the central oil cracking zone of the generator. Another advantage of maintaining the carbon filtering refractory screens at a higher temperature is that the vaporization of enricher oil is thereby insured and the absorption of unvaporized oil on and in the surface of the brick inhibited. Thus the generator in operation does not develop the smoke during the blast period which often occurs in other oil gas generating sets because of improper and incomplete vaporization and gasification of the enriching hydrocarbon.

In general the steam requirements for the various operating cycles heretofore described lie in the range of .3 to 1.2 pounds per pound of oil or hydrocarbon gas cracked through the screens. No additional steam is required for the oil enriching part of the cycle, because the enriching oil can be thoroughly cracked in the atmosphere of mixed hydrogen, hydrocarbon and blue gases which results from the main gas generating step.

The recuperators 42 and 44 which make up a part of the apparatus described in Fig. 2 are essentially additional heat regenerative elements, the use of which further increases the heat balance of the apparatus when operating on a continuous hydrocarbon gas reform cycle with periodic reversal of direction of flow of gas through the generator.

The invention having been thus described, what is claimed as new is:

1. In gas generating apparatus, a refractory lined conduit having a length several times its maximum cross-sectional dimension, valved gas offstakes ported out at each end of the conduit, valve controlled air and steam supply pipes opening into each end of the conduit, a pair of carbon filtering screens each upwards of one foot in depth disposed in spaced relation transversely in the conduit about midway between the ends thereof, each screen comprising a bed of randomly placed ceramic bricks uniformly sized within maximum linear dimensions of two inches to three inches, a pair of checkerbrick regenerators respectively mounted in the conduit between the ends thereof and the nearest ceramic screen, and valve controlled means for introducing liquid hydrocarbon into the conduit at points intermediate said checker brick and each screen and means for introducing gaseous fuel between screens.

2. Apparatus as described in claim 1 in which the conduit comprises a vertical shell, together with a recuperator operatively connected to each gas offtake and to the means for introducing fluid hydrocarbon into the shell and arranged for heat transfer between the hot gas removed from the shell and fluid hydrocarbon on its way into the shell.

3. Apparatus as described in claim 1 in which the conduit comprises a pair of upright vertical shells together with a passageway communicably connecting the shells at their lower ends, and in which the refractory screens are respectively mounted transversely in each of the shells at points immediately above and adjacent the connecting passageway, together with fluid hydrocarbon burners mounted in each shell at points above and below each screen.

4. In gas generating apparatus, a refractory lined conduit comprising a pair of upright vertical shells and a continuously open passageway communicably connecting the shells at their lower ends, valved rich gas offtakes ported out at the top of each shell, stack valve controlled blow gas offtakes at the top of each shell, valve controlled air and steam supply pipes opening into the top of each shell, a pair of carbon filtering screens each upwards of one foot in depth disposed respectively in each of the shells at points immediately above and adjacent the connecting passageway, each screen comprising a bed of randomly placed ceramic bricks uniformly sized within maximum linear dimensions of two inches to three inches, a pair of checkerbrick regenerators respectively mounted in the top of each shell at a spaced distance above the corresponding ceramic screen, a pair of liquid hydrocarbon spraying means located respectively in each shell at a point above the screen and below the checkerbrick regenerator, together with valved fluid hydrocarbon supply pipes opening into the top of each shell, and a valved fluid hydrocarbon supply pipe opening into the passageway connecting the lower ends of the shells at a point between the two screens.

5. In a gas generating apparatus, a structure forming a continuous passage having a length several times its maximum cross-sectional dimension, a refractory lining within said passage, valved gas offtakes ported out at each end of said passage, valve controlled air and steam supply pipes opening into each end of said passage, a pair of carbon filtering screens each upwards of one foot in depth disposed in spaced relation transversely in the passage about midway between the ends thereof, each screen comprising a bed of randomly placed ceramic bricks, checker brick regenerators mounted in the passage between the ends thereof and the nearest ceramic screen, and valve controlled means for introducing liquid hydrocarbons into the passage at points intermediate said checker brick and each screen, means for introducing combustible gas between said screens, and means separate from said last mentioned means for introducing a combustible fluid into said structure for heating the same.

6. In a gas generating apparatus a structure forming a continuous U-shaped passage having a length several times its maximum cross-sectional dimension, a refractory lining within said U-shaped passage, valved gas offtakes ported out at each end of said U-shaped passage, valve controlled air and steam supply pipes opening into each end of said U-shaped passage, a pair of carbon filtering screens each upwards of one foot in depth disposed in spaced relation transversely in the U-shaped passage about midway between the ends thereof, each screen comprising a bed of randomly placed ceramic bricks, checker brick regenerators mounted in the U-shaped passage between the ends thereof and the nearest ceramic screen, and valve controlled means for introducing liquid hydrocarbon into the U-shaped passage at points intermediate said checker brick and each screen means for introducing combustible gas, and means separate from said last mentioned means for introducing a combustible fluid into said structure at points below said screens.

ALFRED JOHNSON.
MORRIS M. BRANDEGEE.